United States Patent [19]
Kobayashi et al.

[11] Patent Number: 5,029,680
[45] Date of Patent: Jul. 9, 1991

[54] AUTOMATIC TRANSMISSION SHIFT CONTROL DEVICE

[75] Inventors: Satoshi Kobayashi, Hiratsuka; Koji Kato, Shizuoka; Hiroshi Yamazaki, Yokohama, all of Japan

[73] Assignees: Nissan Motor Co., Ltd., Yokohama; Fuji Kiko Co., Ltd., Tokyo; Ohi Seisakusho Co., Ltd., Yokohama, all of Japan

[21] Appl. No.: 257,902

[22] Filed: Oct. 14, 1988

[30] Foreign Application Priority Data

Oct. 16, 1987 [JP] Japan .............................. 62-15897[U]
Oct. 16, 1987 [JP] Japan .............................. 62-158966[U]
Oct. 16, 1987 [JP] Japan .............................. 62-158968[U]
Oct. 16, 1987 [JP] Japan .............................. 62-158969[U]

[51] Int. Cl.$^5$ .............................................. B60K 41/28
[52] U.S. Cl. ...................................... 193/4 A; 74/475
[58] Field of Search ................ 192/4 A, 4 C, 4 R; 74/475, 483 R, 878

[56] References Cited

U.S. PATENT DOCUMENTS

| | | | |
|---|---|---|---|
| 4,304,112 | 12/1981 | Osborn | 74/475 |
| 4,365,522 | 12/1982 | Kubota et al. | 74/475 |
| 4,473,141 | 9/1984 | Mochida | 192/1 |
| 4,474,085 | 10/1984 | De Vogelaere et al. | 74/878 |
| 4,610,179 | 9/1986 | Parker | 74/474 |
| 4,660,443 | 4/1987 | Simancik | 74/878 |
| 4,768,610 | 9/1988 | Pagel et al. | 192/4 A |
| 4,884,668 | 12/1989 | Kobayashi et al. | 192/4 A |

FOREIGN PATENT DOCUMENTS

| | | |
|---|---|---|
| 0246353 | 11/1987 | European Pat. Off. . |
| 3048093 | 9/1981 | Fed. Rep. of Germany . |
| 57-42424 | 3/1982 | Japan . |
| 57-163427 | 10/1982 | Japan . |
| 60-185750 | 9/1985 | Japan . |

Primary Examiner—Allan D. Herrmann
Assistant Examiner—Nicholas Whitelaw
Attorney, Agent, or Firm—Pennie & Edmonds

[57] ABSTRACT

An automatic transmission shift control device which prevents shifting from the "Park" position to any other position unless the ignition key is at the "on" position and the brake pedal is fully depressed. A safety feature is incorporated so as to insure against accidental gear shifting. To shift the control from the "Park" position a control button located on the shift handle is manually pressed. The control button mechanically depresses a linkage rod which in turn moves the shift position pin out of its "Park" locking position. However, the linkage rod cannot move downward unless a bushing which has clearance slots for the position pin is rotated by a solenoid, which is acuated only when the ignition is "on" and the brake pedal is pressed. Also, the bushing surface in proximity to the bushing slots is shaped so as to prevent accidental engagement of the positioning pins.

10 Claims, 7 Drawing Sheets

AUTOMATIC TRANSMISSION SHIFT CONTROL DEVICE

BACKGROUND OF THE INVENTION

1. Field of the Invention

The present invention relates in general to automatic transmissions and more particularly to an automatic transmission shift control device of the kind in which when the ignition key is at the "ON" position, shifting of gears from "P(parking)" to other gears cannot be attained unless the brake pedal is fully depressed.

2. Description of the Prior Art

An example of an automatic transmission shift control device of the above described kind is shown in Japanese Utility Model Provisional Publication No. 60-185750.

A problem of the prior art shift control device is that the solenoid pin of the solenoid is liable to be deformed, which causes a malfunction of the shift control device. The cause of the deformation is that if the selector lever, when in a locked condition, is operated for shifting gears, the solenoid pin receives the operating force to resist against movement of the selector lever. In order to solve this problem, the solenoid pin may be increased in strength so as not to be deformed by such an operating force. But this causes another problem in that the large-sized solenoid increases the manufacturing cost, weight and design and layout restrictions.

SUMMARY OF THE INVENTION

In accordance with the present invention, there is provided an improved automatic transmission shift control device which comprises a selector lever movable into a plurality of gear positions including a parking position and having a hollow cylindrical post formed with a pair of diametrically opposed openings and a knob attached to the upper end of the post, and selector lever shift position control means for controlling movement of the selector lever.

The selector lever shift position control means includes a position plate having a profiled opening defining the gear positions, a position pin installed transversely of the post in the openings for up-and-down movement and releasably engaged in the position plate for locating the selector lever in one of the gear positions, a rod installed in the post for up- and-down movement and supporting the position pin at the lower end thereof, a push button mounted in the knob for substantially horizontal movement and cooperative with the rod for disengaging the position pin from the position plate. A bushing mounted on the post which allows rotation but prevents axial movement and has at its upper end a pair of diametrically opposed notches with which the position pin is engaged for disengaging the position pin from the position plate. A solenoid is operatively connected to the bushing to rotate the same selectively between a first position where the notches are aligned with the position pin and a second position where the notches are misaligned with the position pin. Safety means is included for preventing the position pin from being erroneously aligned with the notches. The solenoid is operative in such a way that the bushing is rotated into the first position when the position pin is at the parking position and the brake pedal is fully depressed and into the second position when the position pin is at the parking position and the brake pedal is free from depression.

In one aspect of the invention, the safety means comprises a stopper for limiting upward movement of the bushing.

The above structure can solve the above noted problems inherent in the prior art device.

It is accordingly an object of the present invention to provide an improved automatic transmission shift control device of the above described character which is assuredly prevented from malfunction caused by erroneous or unintended movement of a bushing and by deformation or damage of a solenoid pin and other constitutent parts.

It is another object of the present invention to provide an improved automatic transmission shift control device which can effectively prevent its constituent part or parts from being damaged without increasing the strength of each constituent part of itself.

It is a further object of the present invention to provide an improved automatic transmission shift control device of the above described character which does not require a solenoid to be large-sized and therefore does not increase the manufacturing expense, weight and the design and layout restrictions.

DETAILED DESCRIPTION OF THE PREFERRED EMBODIMENTS

Figure 1:
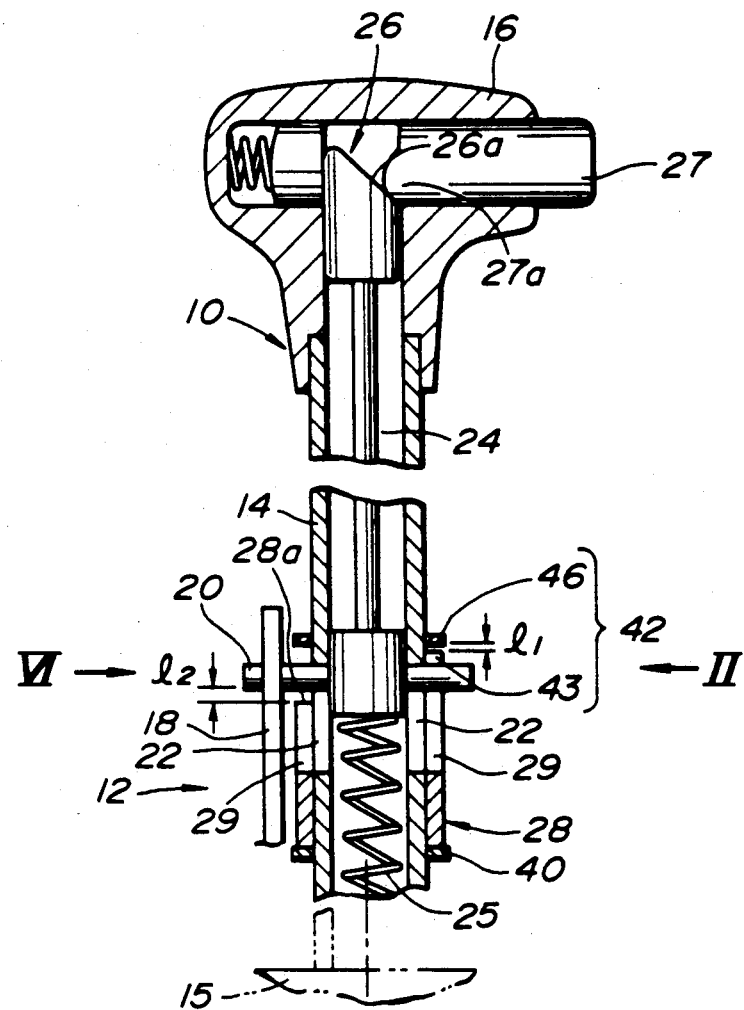
FIG. 1 is a sectional, partly omitted, view of an automatic transmission shift control device according to an embodiment of the present invention.

Referring to FIGS. 1 to 7, an automatic transmission shift control device according to an embodiment of the present invention is shown as comprising a selector lever 10 and a selector lever shift position control means 12 for controlling the movement of the selector lever 10.

The selector lever 10 is swingable into various gear positions including a "P" position for shifting gears of an associated automatic transmission (not shown). The selector lever 10 consists of a hollow cylindrical post 14 pivotally mounted at the lower end on a vehicle body 15 and a knob 16 attached to the upper end of the post 14.

Figure 6:
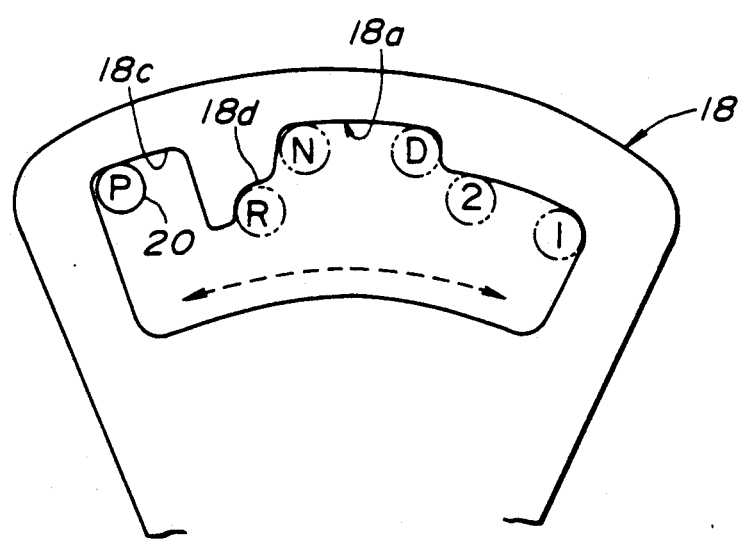
FIG. 6 is a view taken in the direction of the arrow VI of FIG. 1.
Figure 7:
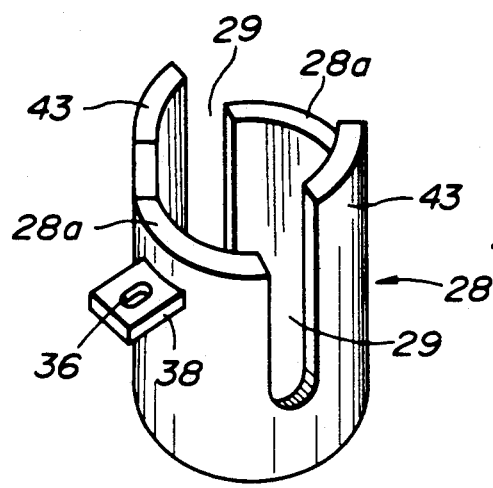
FIG. 7 is a perspective view of a bushing employed in the embodiment of FIG. 1.

The selector lever shift position control means 12 includes a position plate 18 which is stationary, i.e., fixedly attached to the vehicle body 15. As shown in FIG. 6, the position plate 18 is formed with profiled opening 18a for locating the selector lever 10 in various gear positions including a "P" position. A position pin 20 is engaged in the profiled opening 18a of the position plate 18 for positioning the selector lever 10 at one of the gear positions. The hollow cylindrical post 14 is formed with a pair of diametrically opposed openings 22 and 22 for receiving therein the position pin 20. The openings 22 and 22 are elongated axially of the post 14 for allowing up-and-down movement of the position pin 20 relative to the post 14 and the position plate 18. The position pin 20 extends across the post 14 and has opposite ends projecting outwardly from the openings 22 and 22. A rod 24 is installed in the post 14 for up-and-down movement and attached to the position pin 20 at the lower end. More specifically, the lower end of the rod 24 is attached to a slider 21 which is slidably received within the post 14 and movable together with the position pin 20. A slide cam 26 having a tapered cam face 26a is installed in the knob 16 and attached to the upper end of the rod 24 for up-and-down movement with same. A coil spring 25 is installed in the post 14 to urge the rod 24 and the slide cam 26 upwardly together with the position pin 20. A control button 27 is installed in the knob 16 for substantially horizontal movement and has an inner end portion 27a engaged with the tapererd cam surface 26a so that pushing the control botton 27 into the knob 16 or allowing the former to project outwardly from the latter causes downward movement or upward movement of the slide cam 26 and the rod 24. A bushing 28 has a hollow cylindrical shape as shown in FIG. 7 and is, concentrically mounted on the post 14 so as to allow rotation but resist against axial movement. The bushing 28 has at an upper end portion a pair of diametrically opposed notches 29 and 29 with which the position pin 20 is engaged when the selector lever 10 is moved from the "P" position into other gear positions as the "R (reverse)" position, "N(neutral)" position, "D (drive)" position, "1(first gear)" position and the "2(second gear)" position. In other words, in order to shift the selector lever 10 from the "P" position to other gear positions it is necessary to move the position pin 20 into the lower end portions of the openings 22 and 22. To attain this, it is inevitable for the position pin 20 to be moved into the notches 29 and 29.

Figure 2:
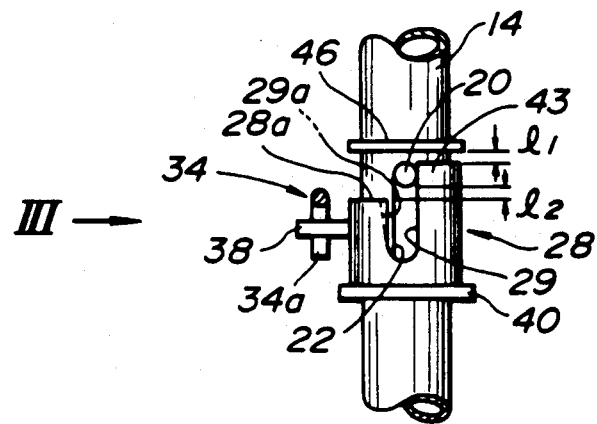
FIG. 2 is a view taken in the direction of the arrow II of FIG. 1.
Figure 3:
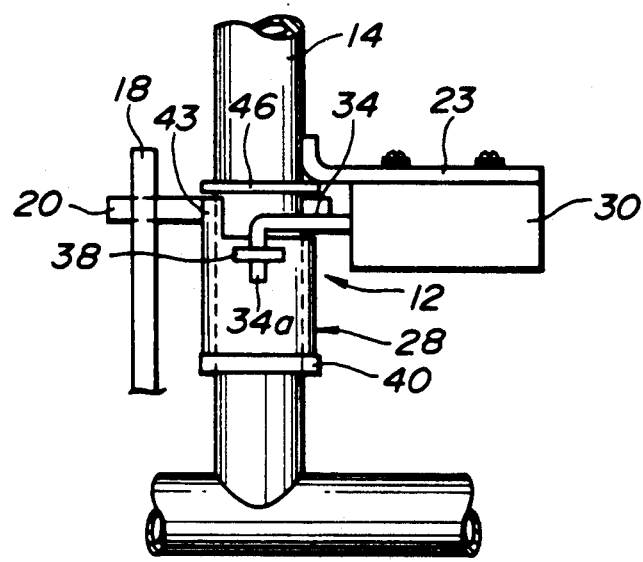
FIG. 3 is a view taken in the direction of the arrow III of FIG. 2.
Figure 4:
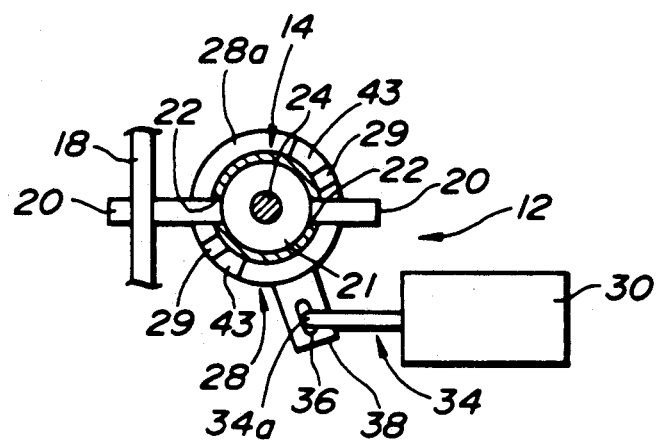
FIG. 4 is a cross sectional view of the embodiment FIG. 1 but showing the shift control device in another operative position.
Figure 5:
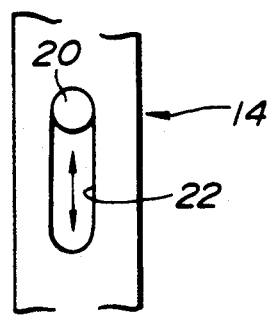
FIG. 5 is an elevational, partly omitted, view of a post and a position pin employed in the embodiment of FIG. 1.

A solenoid 30 is installed on the post 14 by means of a bracket 23 and connected to the bushing 28 for controlling the position thereof as follows. That is, when the position pin 20 is at the "P" position and the brake pedal is not depressed, the bushing 28 is rotated into a selector lever locking position where the notches 29 and 29 are misaligned with the position pin 20 as shown in FIG. 4. When the brake pedal is fully depressed to cause a stop switch (not shown) to be turned on and thereby energize the solenoid 30, the bushing 28 is moved from the selector lever locking position into a selector lever unlocking position where the notches 29 and 29 are aligned with the position pin 20 as shown in FIG. 2. Indicated by the reference numeral 34 is a solenoid pin projectable from and retractable into the solenoid 30 and has an end 34a engaged in a slot 36 formed in an outer peripheral projection or radially projecting arm 38 of the bushing 28. Indicated by the reference numeral 40 is a bushing support 40 welded or otherwise secured to the post 14 for supporting thereon the bushing 28.

The selector lever shift position control means 12 further includes a limiting means 42 for limiting upward movement of the bushing 28. The limiting means 42 consists of a pair of axial projections 44 and 44 provided to the upper end 28a of the bushing 28 and a stopper 46 installed on the post 14. More specifically, the projections 44 and 44 are arranged on one side of the notches so that the position pin 20 is swingable between two positions where it is aligned and misaligned with the notches 29 and 29. The stopper 46 is arranged above the bushing 28 so as to abut upon the projections 44 and 44 when upward movement of the bushing 28 reaches a predetermined amount for thereby limiting upward movement of the bushing 28. The stopper 46 may be a snap ring or the like. In the meantime, the distance $l_1$ between each projection 29 and the stopper 46 and the distance $l_2$ between the upper end 28a of the bushing 28 and the position pin 20 in its highest possible position are designed so as to satisfy the relation of $l_1 \leq l_2$ when the bushing 28 is in contact with the bushing support 40.

With the foregoing structure, when an ignition key (not shown) is at the "ON" position, shifting of the selector lever 10 from the "P" position to other gear positions is prevented as follows unless a brake pedal (not shown) is fully depressed. When the ignition key is at the "ON" position and the brake pedal is not fully depressed, the solenoid 30 is energized to allow the solenoid pin 34 to project outwardly therefrom. By this, the bushing 28 is rotated into the selector lever locking position where the notches 29 and 29 are misaligned with the position pin 20. In order to shift the selector lever 10 from the "P" position to other gear positions as "R", "N", "D", "2" and "1", it is necessary to push the control button 27 into the knob 16 for thereby pushing the position pin 20 down into its lowest possible position, i.e., into the lower end portions of the openings 22 and 22 so that the position pin 20 can clear a stopper portion 18b of the profiled opening 18a of the position plate 18. However, the downward movement of the position pin 20 in response to the pushing of the control button 27 inwardly of the knob 16 is prevented by the bushing 28, i.e., the control button 27 cannot be pushed into the knob 16 sufficiently or by a predetermined amount since the notches 29 and 29 are misaligned with the position pin 20 to make the position pin 20 abut upon the upper end 28a of the bushing 28.

In the above, it will be undertood that in order to prevent shifting of gears from the "P" position to other gear positions when the brake pedal is not depressed, it is only necessary to rotate, by the operation of the solenoid 30, the bushing 28 from the selector lever unlocking position to the selector lever locking position. A required power for attaining the selector lever shift position control can therefore be considerably smaller as compared with that required by the prior art device. Accordingly, the solenoid 30, the bushing 28, etc. can be compact in size, thus making it possible to reduce the cost and weight.

It will be further understood that the force with which the position pin 20 is subjected during the above prevention of gear shifting is sufficiently small since the position pin 20 receives only the force which is transferred from the control button 27 through the slide cam 26. The force applied to the control button 27 is not so large. Further, the force received by the position pin 20 is smaller than the force applied to the control button 27 since it is reduced during transmission from the control button 27 to the slide cam 26 by the effect of the tapered cam surface 26a.

In order to shift the selector lever 10 from the "P" position to other gear positions, the brake pedal is fully depressed. When the brake pedal is fully depressed, the solenoid pin 34 is deenergized and thus retracts into the solenoid 30, rotating the bushing 28 into the selector lever unlocking position where the notches 29 and 29 are aligned with the position pin 20. Pushing the control button 27 into the knob 16 causes movement of the position pin 20 into the lower end portions of the openings 22 and 22, whereby to make it possible for the position pin 20 to clear the stopper portion 18b of the profiled opening 18a of the position plate 18. The selector lever 10 therefore can be moved from the "P" position to other gear positions.

It is to be noted that by the provision of the limiting means 42 for limiting upward movement of the bushing 28 the bushing 28 can be assuredly rotated between the above described two positions by the operation of the solenoid 30, thus increasing the reliability of operation of the selector lever shift position control means 12. That is, the bushing 28 may move upwards in response to upward movement of the position pin 20 and vibrations of the vehicle body. When the upward movement of the bushing 28 reaches a predetermined amount, the position pin 20 in its highest possible position, i.e., in the position engaged in the upper end portion of the openings 22 and 22, can engage in the notches 29 and 29. When this is the case, it is impossible to rotate the bushing 28 from the selector lever unlocking position to the selector lever locking position even if the soleoid 30 is actuated and tries to do so, thus causing a malfuction of the selector lever shift position control means 12, i.e., making it possible, even if the brake pedal is not depressed, to shift the selector lever 10 from the "P" position to any other gear positions. However, by the provision of the limiting means 42, the projections 44 and 44 of the bushing 28 are brought into abutment upon the stopper 46 when the bushing 28 moves the distance $l_1$ upwardly, thus limiting the upward movement of the bushing 28. Since the distance $l_2$ between the position pin 20 in its highest possible position and the upper end 28a of the bushing 28 when the bushing 28 is in contact with the bushing support 40 is designed so as to be larger than the distance $l_1$, the position pin 20 is assuredly prevented from being engaged in the notches 29 and 29, thus making it possible to prevent a malfunction of the selector lever shift position control means 12 assuredly. The distance is provided for compensating for allowance of the bushing 28, stopper 46, etc.

In the meantime, by constructing so that the position pin 20 abuts upon the vertical walls of the projections 44 and 44 when the bushing 28 is in the selector lever unlocking position, it becomes possible to guide movement of the bushing 28 into and out of the notches 29 and 29 by means of the projections 44 and 44, thus making assured the movement of the position pin relative to the notches 29 and 29. Further, by constructing so that one upstanding or vertical side 29a of each notch 29 opposite to the other vertical side where the projection 29 is located is inclined outward as shown by the dotted lines in FIG. 2, it becomes easier to move the position pin 20 out of the notches 29 and 29 since such an inclined side is effective for preventing the position pin 20 from being locked in the notches 29 and 29 when the bushing 28 is driven by the solenoid 30 while receiving in the notches 29 and 29 the position pin 20.

Figure 8:
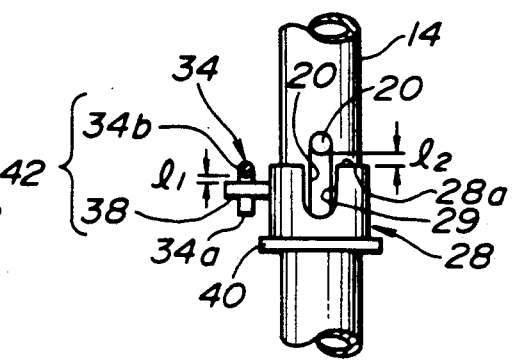
FIG. 8 is a view similar to FIG. 2 but showing a varient of the embodiment of FIG. 1.

FIG. 8 shows a variant of the foregoing embodiment. In this variant, the end 34a of the solenoid pin 34 inserted into the slot 36 of the arm 38 of the bushing 28 is bent vertically downward to constitute a vertical portion engaged in the slot 36. The solenoid pin 34 further has a horizontal portion 34b located above the arm 38. The above described limiting means 42 is constituted by the horizontal portion 34b of the solenoid pin 34 and the arm 38 of the bushing 28. The distance $l_1$ between the horizontal portion 34b of the solenoid pin 34 and the arm 38 and the distance $l_2$ between the position pin 20 in its highest possible position and the upper end 28a of the bushing 28 when the bushing 28 is in contact with the bushing support 40 are designed so as to satisfy the relation of $l_1 \geqq l_2$.

With this structure, the arm 38 is brought into abutment upon the horizontal portion 34b of the solenoid pin when the bushing 28 moves the distance $l_1$, thus making it possible to limit upward movement of the bushing 28 similarly to the previous embodiment. This embodiment makes it possible to reduce the number of constituent parts as compared with the previous embodiment.

In the foregoing, it will be understood that the the limiting means 42 constitute safety means for preventing erroneous operation of the position pin 20, i.e., for preventing the position pin 20 from being erroneously aligned with the notches 29 and 29, and thereby attaining an assured and reliable operation of the selector lever shift position control means 12.

Figure 9:
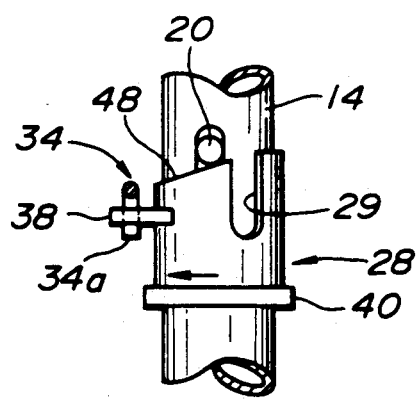
FIG. 9 is a view similar to FIG. 2 but showing another embodiment of the present invention.
Figure 10:
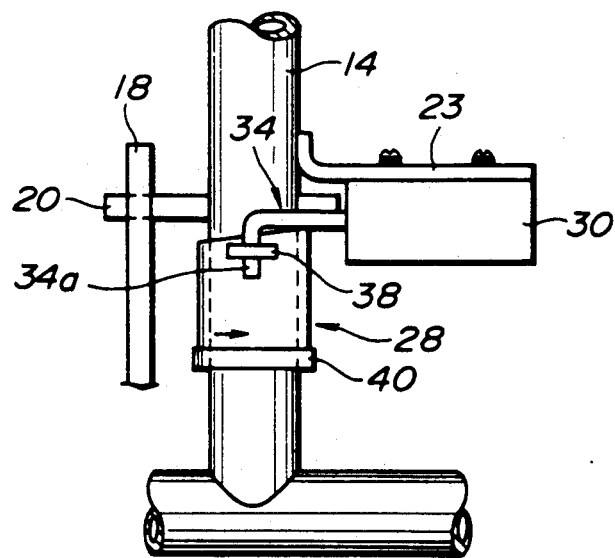
FIG. 10 is a view taken in the direction of the arrow X of FIG. 9.

FIGS. 9 and 10 show another embodiment of the present invention. In this embodiment, the bushing 28 has at the upper end portion for contact with the position pin 20 an inclined surface 48 which prevents rotation of the bushing 28 toward the selector lever unlocking position. The inclined surface 48 is so formed as to descend as it goes away from one adjacent notch 29 so that the bushing 28 is urged away from the selector lever unlocking position when the position pin 20 is pushed down to abut upon the bushing 28.

With this structure, when the brake pedal is not depressed, pushing the push bottom 27 (refer to FIG. 1) inwards causes the position pin 20 to abut upon the inclined surface 48. By this, the bushing 28 is subjected to a force that urges the bushing 28 away from the selector lever unlocking position, thus making it possible to assuredly prevent such a possibility that abutment of the position pin 20 and the bushing 28 causes unintended rotation of the bushing 28 into the selector lever unlocking position. Accordingly, even when the angle of rotation of the bushing 28 between the locking and unlocking positions is designed small so that the point or place at which the position pin 20 abuts upon the upper end 28a of the bushing 28 is located very close to the notch 29, it becomes possible to assuredly prevent erroneous alignment of the position pin and the notch 29, thus making it possible to make the selector lever shift position control means 12 more compact.

Figure 11:
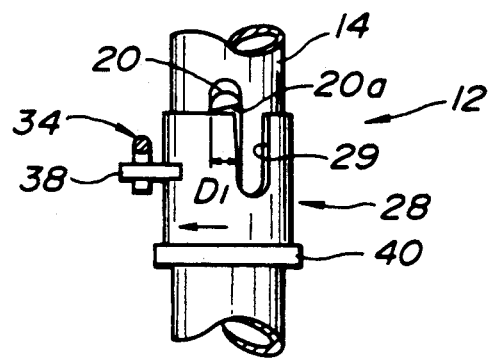
FIGS. 11 and 12 are views similar to FIG. 2 but showing varients of the embodiment of FIG. 9.

FIG. 11 shows a variant of the embodiment of FIGS. 9 and 10. In this variant, the position pin 20 is formed at one end with an inclined surface 20a which is inclined so as to descend as it goes away from the notch 29. The bushing 28 is not formed with such an inclined surface 48 as in the embodiment of FIGS. 9 and 10. With this structure, even when the angle of rotation of the bushing 28 is small, the position pin 20 is assuredly brought into line-to-surface contact with the upper end of the busing 28 in the place which is apart from the notch 29 by the distance $D_1$ larger than that in case of the position pin 20 having a round cross section throughout the length, thus making it possible to produce the similar effect as the embodiment of FIGS. 9 and 10.

Figure 12:
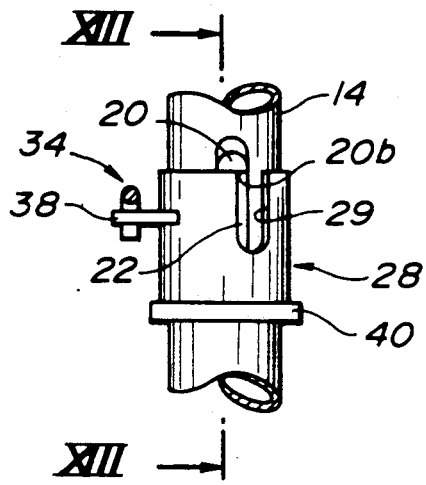
Figure 13:
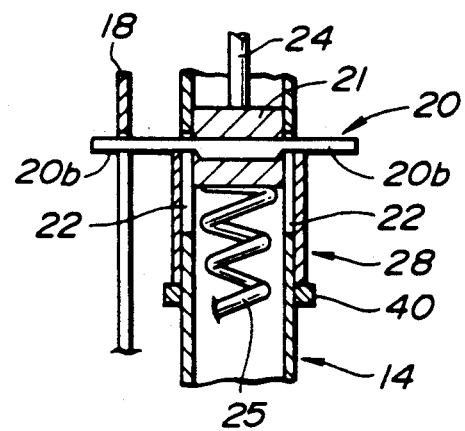
FIG. 13 is a sectional view taken along the line XIII—XIII of FIG. 12.

FIG. 12 and 13 show another variant of the embodiment of FIGS. 9 and 10. In this variant, the position pin 20 has, at the opposite end portions, horizontal surface portions 20b and 20b which are brought into surface-to-surface contact with the upper end of the bushing 28 when the bushing 28 is misaligned with the notches 29 and 29. This structure can assuredly prevent such a possibility that the bushing 28 is driven by the position pin 20 and unintendedly moved into the unlocking position. Further, since the position pin 20 and the upper end of the bushing 29 are brought into surface-to-surface contact, the bushing 28 is subjected at a wider area to a force from the position pin 20, thus making it possible to reduce the thickness of the bushing 28 without causing any defect and thereby contributing to reduction of the overall weight of the selector lever position control means 12.

Figure 14:
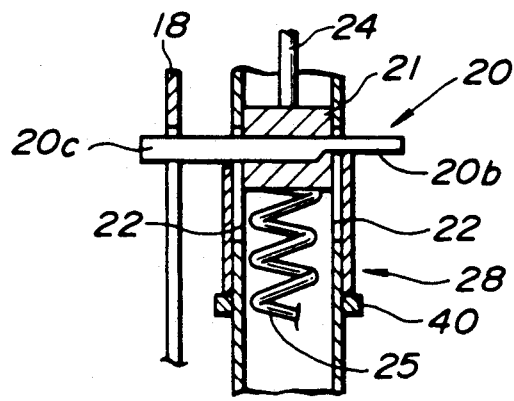
FIG. 14 is a view similar to FIG. 13 but showing a varient of the embodiment of FIG. 9.

FIG. 14 shows a further variant of the embodiment of FIGS. 9 and 10. This variant is substantially similar to the variant of FIGS. 12 and 13 except that the position pin 20 has the horizontal surface 20b only at one end thereof. The other end 20c of the position pin 20 on the side of the position plate 18 is not formed with the horizontal surface 20a but has a round cross section. The round cross section end 20c is adapted not to abut upon the upper end 28a of the bushing 28 even when the position pin 20 is pushed down to allow the horizontal surface 20a to contact the upper end 28a of the bushing 28. By this, the required strength of the position pin 20 can be attained without increasing the size.

In the above, it will be understood that the inclined surface 48 of the bushing 28, the inclined surface 20a of the position pin and the horizontal surface 20b of the position 20 constitute safety means for preventing the position pin 20 from being erroneously aligned with the notches 29 and 29 and thereby attaining an assured and reliable operation of the selector lever shift position control means 12. It will be also understood that the safety means is effective for increasing the strength without increasing the size, i.e., for attaining a compact structure.

Figure 15:
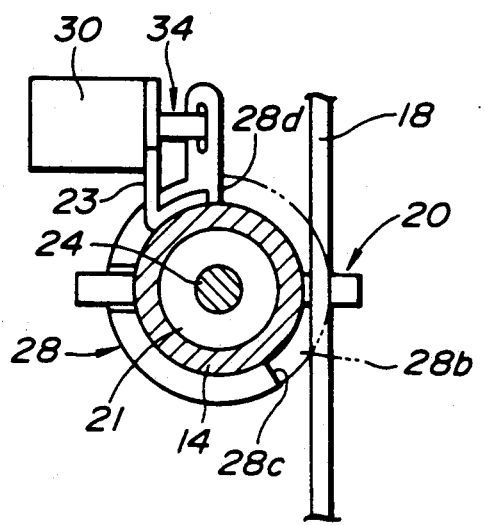
FIG. 15 is a view similar to FIG. 4 but showing a further embodiment of the present invention.
Figure 16:
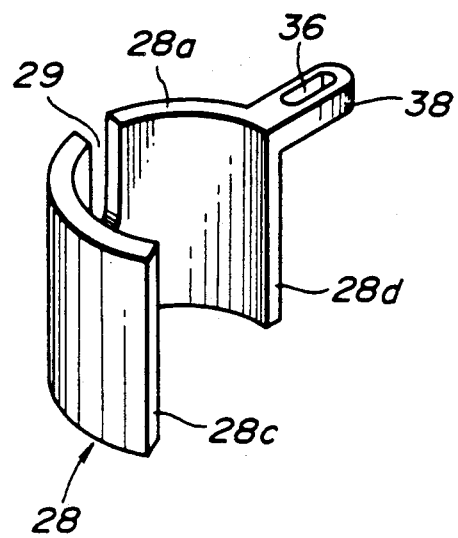
FIG. 16 is a perspective view of a bushing employed in the embodiment of FIG. 15.

FIGS. 15 and 16 show a further embodiment in which the bushing 28 is partly cut off throughout the length on the side of the position plate 18 and formed into a part-cylindrical shape, i.e., partly cut off in such a manner that a cut off portion 28b includes one of the notches 29 and 29, and the position plate 18 is arranged so as to extend through the cut off portion 28b of the bushing 28. More specifically, the bushing 28 is partly cut off by such an amount that the opposite circumferential ends 28c and 28d of the bushing 28 do not project beyond the circumference of the post 14 toward the position plate 18 when the bushing 28 moves between the locking and unlocking positions, i.e., the opposite circumferential ends 28c and 28d of the bushing 28 do not project into the position plate to interfere therewith when the bushing 28 moves between the locking and unlocking positions.

With the above structure, the post 14 and the position plate 18 can be nearer than before, thus making it possible to reduce the moment applied to postion pin 20 when the position pin abuts upon the position plate and therefore making it possible to reduce the required strength of the position pin 20. Further, while the prior art structure requires to first install the bushing on the post and then install the position pin in place by press fit, the bushing 28 in this embodiment can be installed on the post by being pressed radially of the post 14, thus making it possible to improve the assembling efficiency.

In the above, it will be understood that the above improvements in the bushing 28 and the position plate 18 constitutes safety means for increasing the structural strength without increasing the size and thereby preventing the position pin 20 from being errornesouly aligned with the notch 29 and attaining an assured and reliable operation of the selector lever shift postion control means 12.

Figure 17:
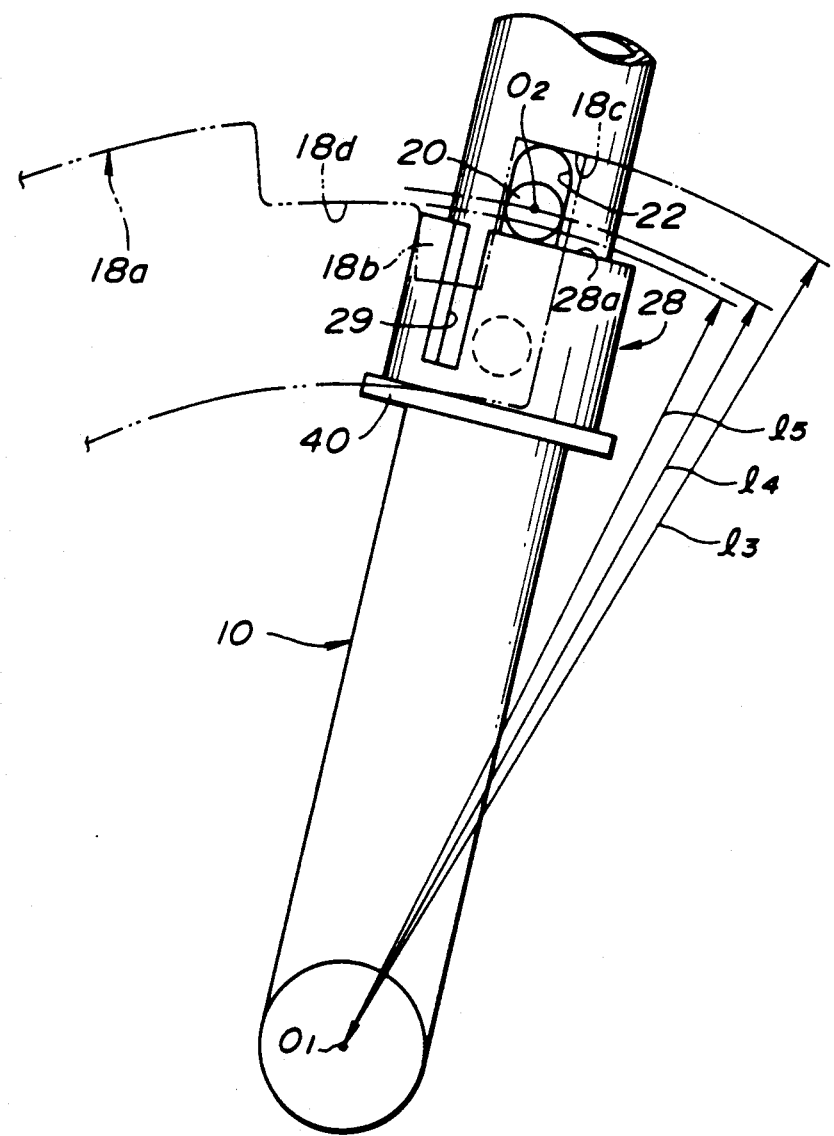
FIG. 17 is a view similar, though enlarged, to FIG. 2 but showing a further embodiment of the present invention.

FIG. 17 shows a further embodiment in which the bushing 28, position plate 18 and the position pin 20 are constructed so as to satisfy the relation of $l_3 > l_4 > l_5$ where $l_3$ is the distance between the pivot center $O_1$ of the selector lever 10 and a stepped portion 18c of the position plate profiled opening 18a for locating the position pin 20 in the "P" position, $l_4$ is the distance between the pivot center $O_1$ of the selector lever 10 and the center $O_2$ of the position pin 20 held in contact with the upper end 28a of the bushing 28 which in turn contacts the bushing support 40 and $l_5$ is the distance between the pivot center $O_1$ of the selector lever 10 and the stepped portion 18d of the position plate profiled opening 18a for locating the position pin 20 in the "R" position.

With this structure, when the driver tries to shift the selector lever 10 while pushing the push button 27 inwards without noticing that the selector lever 10 is in a locked condition, the operating force applied to the selector lever 10 is transferred through the position pin 20 to a position plate portion which is located above the stopper portion 18b and adjacent the stepped portion 18c, which position plate portion has a structural strength larger than that of the stopper portion 18b since the lowest possible position of the position pin 20 relative to the position plate 18 is higher than before, i.e., the lowest possible position is shown by the solid line in FIG. 1 and the position pin 18 cannot move downward therefrom.

Figure 18:
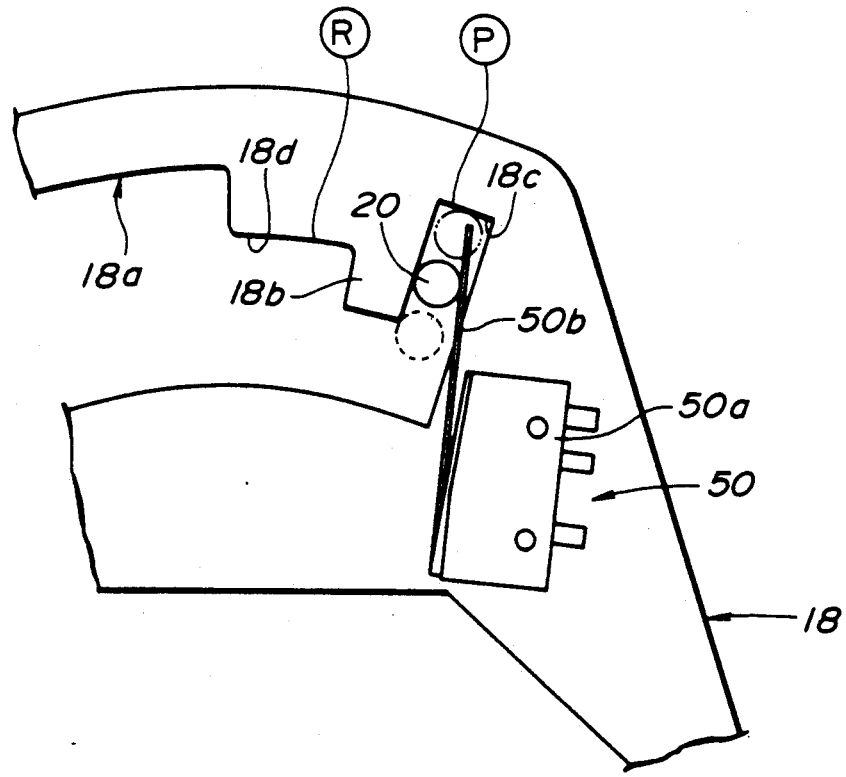
FIG. 18 is an elevational, partly omitted, view of a position plate and a "P" position detecting switch employed in the the embodiment of FIG. 17.

In FIG. 18, a "P" position detecting switch is generally indicated by the reference numeral 50 and consists of a main body 50a and a substantially straight contact tongue 50b swingable about an end between a switching on position and a switching off position. Since the detecting switch 50 is small-sized, the movable range or stroke of the contact tongue 50b is small. In this embodiment, the main body 50a of the "P" position detecting switching 50 is installed on the position plate 18 in such a way as to be located under the stepped portion 18c and the contact tongue 50b is arranged substantially parallel to the line of travel of the position pin 20 between the stepped portion 18c and the stopper portion 18b.

With this structure, the actual stroke of the contact tongue 50b can be smaller than before, thus making it possible to detect the shifting condition that the position pin 20 is in the "P" position over a wider range of travel of the position pin 20. That is, in this embodiment, it is structured so that the detecting switch 50 is switched on when the position pin 20 reaches to the position shown by the solid line in FIG. 18. Since this position is lower than the position of the position pin 20 shown by the solid line in FIG. 17, the detecting switch 50 can assuredly detect the selector lever shift condition in which the position pin 20 is located between the position where it is in contact with the upper end 28a of the bushing 28 and the position where it is brought into abutment upon the stepped portion 18c of the position plate 18 when the drier removes his hand from the push button 27.

In the above, it will be understood that the above improvements in the bushing 28, the position plate 18 and the "P" position detecting switch 50 constitute safety means for increasing the structural strength without increasing the size and thereby preventing the position pin 20 from being erroneously align with the notches 29 and 29 and attaining an assured and reliable operation of the selector lever shift position control means 12.

What is claimed is:

1. An automatic transmission shift control device for a vehicle having a brake pedal, comprising:
   a selector lever movable into a plurality of gear positions including a parking position and having a hollow cylindrical post having a pair of diametrically opposed openings and having a knob attached to a first end of said post; and
   a selector lever shift position control means for controlling movement of said selector lever;
   said selector lever shift position control means including a position plate having a profiled opening defining said gear positions, a position pin installed transversely through said post, and in said openings, said pin having a first and second end projecting radially from said post for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post, such that an upper end of said bushing is toward said first end of said post and such that said bushing can be moved on said post, and having at said upper end a pair of diametrically opposed notches with which said position pin is engaged for disengaging said position pin from said position plate, a solenoid operatively connected to said bushing to rotate same selectively between a first position, where said notches are aligned with said position pin, and a second position where said notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches;
   wherein said bushing has at said upper end thereof a pair of axial projections which are arranged on one side of said respective notches, said selector lever shift position control means further including a bushing support secured to said post and supporting thereon said bushing, and a stopper installed on said post at a location above said bushing so that said bushing abuts at said projections upon said stopper when upward movement of said bushing reaches a predetermined amount, said projections and said stopper constituting said safety means.

2. An automatic transmission shift control device as set forth in claim 1 wherein one upstanding side of each of said notches opposite to the other upstanding side where each of said projections is located is inclined outwards.

3. An automatic transmission shift control device as set forth in claim 2 wherein a distance $l_1$ between each of said projections and said stopper is determined such that $l_1 \leq l_2$, where $l_2$ is a distance between said upper end of said bushing and said position pin when said position pin is at its closest functional position to said first end of said hollow rod.

4. An automatic transmission shift control device as set forth in claim 1 wherein said selector lever shift position control means further comprises a slide cam installed in said knob for up-and-down movement, said slide cam being attached to the upper end of said rod to move together therewith and having a tapered cam surface with which an inner end of said push button is engaged so that substantially horizontal movement of said push button is converted into up-and-down movement of said rod.

5. An automatic transmission shift control device for a vehicle having a brake pedal, comprising:
   a selector lever movable into a plurality of gear positions including a parking position and having a hollow cylindrical post having a pair of diametrically opposed openings and having a knob attached to a first end of said post; and
   selector lever shift position control means for controlling movement of said selector lever;
   said selector lever shift position control means including a position plate having a profiled opening defining said gear positions, a position pin installed transversely to said post and within said openings, said pin having a first and second end projecting radially from said post for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post, such that an upper end of said bushing is toward said first end of said post and such that said bushing can be moved on said post, and having at said upper end a pair of diametrically opposed notches with which said position pin is engaged for disengaging said position pin from said position plate, a solenoid operatively connected to said bushing to rotate same selectively between a first position, where said notches are aligned with said position pin, and a second position where aid notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches;

wherein said bushing has at said upper end an inclined surface for contact with said position pin and in which said inclined surface is closest to said first end of said post at a point along said inclined surface directly adjacent to one of said notches, said inclined surface constituting said safety means.

6. An automatic transmission shift control device for a vehicle having a brake pedal, comprising:
  a selector lever movable into a plurality of gear positions including a parking position and having a hollow cylindrical post having a pair of diametrically opposed openings and having a knob attached to a first end of said post; and
  selector lever shift position control means for controlling movement of said selector lever;
  said selector lever shift position control means including a position plate having a profiled opening defining said gear positions, a position pin installed transversely to said post and within said openings, said pin having a first and second end projecting radially from said post for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said portion plate, a bushing mounted on said post, such that an upper end of said bushing is toward said first end of said post and such that said bushing can be moved on said post, and having at said upper end a pair of diametrically opposed notches with which said position pin is engaged for disengaging said position pin from said position plate, a solenoid operatively connected to said bushing to rotate same selectively between a first position, where said notches are aligned with said position pin, and a second position where said notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches;
  wherein at least one of said position pin ends has an inclined surface so that said position pin is brought into line-to-line contact with said upper end of said bushing when they both abut upon each other, said inclined surface being formed so as to descend away from said hollow post first end as said surface proceeds away from adjacent one of said notches, said inclined surface constituting said safety means.

7. An automatic transmission shift control device for a vehicle having a brake pedal, comprising:
  a selector lever movable into a plurality of gear positions including a parking position and having a hollow cylindrical post having a pair of diametrically opposed openings and having a knob attached to a first end of said post; and
  selector lever shift position control means for controlling movement of said selector lever;
  said selector lever shift position control means including a position plate having a profiled opening defining said gear positions, a position pin installed transversely to said post and within said openings, said pin having a first and second end projecting radially from said post for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post, such that an upper end of said bushing is toward said first end of said post and such that said bushing can be moved on said post, and having at said upper end a pair of diametrically opposed notches with which said position pin is engaged for disengaging said position pin from said position plate, a solenoid operatively connected to said bushing to rotate same selectively between a first position, where said notches are aligned with said position pin, and a second position where said notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches;
  wherein at least one of said position pin ends has a planar surface so that the planar surface of said position pin is brought into surface-to-surface contact with said upper end of said bushing when they both abut upon each other, said planar surface constituting said safety means.

8. An automatic transmission shift control device as set forth in 7 wherein the other of said position pin ends, located on a side of said rod so as to engage with said position plate, has a round cross section, said other position pin end being held out of contact with said upper end of said bushing even when said horizontal surface of said position pin is brought into contact with said upper end of said bushing.

9. An automatic transmission shift control device for a vehicle having a brake pedal, comprising:
  a selector lever movable into a plurality of gear positions including a parking position and having a hollow cylindrical post having a pair of diametrically opposed openings and having a knob attached to a first end of said post; and
  selector lever shift position control means for controlling movement of said selector lever;
  said selector lever shift position control means including a position plate having a profiled opening defining said gear positions, a position pin installed transversely to said post and within said openings, said pen having a first and second end projecting radially from said post for up-and-down movement and releasable engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post, such that an upper end of said bushing is toward said first end of said post and such that said bushing can be moved on said post, and having at said upper end a pair of diametrically opposed notches with which said position pin is engaged for disengaging said position pin from said position plate, a solenoid operatively connected to said bushing to rotate same selectively between a first position, where said notches are aligned with said position pin, and a second position where said notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches; wherein said bushing is partly cut off throughout a length on a side of said bushing facing toward said position plate in such a way that a cut off position of said bushing includes one of said notches, said position plate being arranged to extend through said cut off portion of said bushing, said bushing and said position plate arranged to extend through said cut off portion constituting said safety means.

10. An automatic transmission shift control device for a vehicle having a brake pedal, comprising:
   a selector lever movable into a plurality of gear positions including a parking position and having a hollow cylindrical post having a pair of diametrically opposed openings and having a knob attached to a first end of said post; and
   selector lever shift position control means for controlling movement of said selector lever;
   said selector lever shift position control means including a portion plate having a profiled opening defining said gear positions, a position pin installed transversely to said post and within said openings, said pin having a first and second end projecting radially from said post, for up-and-down movement and releasably engaged in said position plate for positioning said selector lever at one of said gear positions, a rod installed in said post for up-and-down movement and supporting said position pin at the lower end thereof, a control button mounted in said knob for substantially horizontal movement and cooperative with said rod to disengage said position pin from said position plate, a bushing mounted on said post, such that an upper end of said bushing is toward said first end of said post and such that said bushing can be moved on said post, and having at said upper end a pair of diametrically opposed notches, with which said position pin is engaged, for disengaging said position pin from said position plate, a solenoid operatively connected to said bushing to rotate same selectively between a first position where said notches are aligned with said position pin and a second position where said notches are misaligned with said position pin, said solenoid being operative in such a way that said bushing is rotated into said first position when said position pin is at said parking position and the brake pedal is fully depressed and into said second position when said position pin is at said parking position and the brake pedal is free from depression, and safety means for preventing said position pin from being erroneously aligned with said notches;
   in which said profiled opening of said position plate having first and second stepped portions for respectively locating said position pin in said parking position and a reverse gear position and a stopper portion located between said first and second stepped portions so that said positions when moved from said parking position to said reverse gear portion, said position plate and said position pin being constructed such that $l_3 > l_4 > l_5$ where $l_3$ is a distance between a pivot center of said selector lever and said first stepped portion, $l_4$ is a distance between said pivot center and a center of said position pin when said position pin is held in contact with the upper end of said bushing which is in turn held in contact with a bushing support secured to said post, and $l_5$ is a distance between said pivot center and said second stepped portion, said position plate, said position pin and said selector lever constituting said safety means; wherein said selector level shift position control means further includes a parking position detecting switching consisting of a main body and a substantially straight contact tongue swingable about one end, said parking position detecting switching being installed on said position plate in such a way that said main body is located under said first stepped portion and that said contact tongue is substantially parallel to the line of travel of said position pin between said first stepped portion and said stopper portion.

* * * * *